(12) United States Patent
Imai et al.

(10) Patent No.: US 12,131,597 B2
(45) Date of Patent: Oct. 29, 2024

(54) INSPECTION ASSISTANCE PROGRAM, RECORDING MEDIUM, AND INSPECTION ASSISTANCE SYSTEM

(71) Applicant: ISUZU MOTORS LIMITED, Tokyo (JP)

(72) Inventors: Akira Imai, Fujisawa (JP); Masakazu Ishimaru, Fujisawa (JP); Takahiro Suesada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 229 days.

(21) Appl. No.: 17/618,219

(22) PCT Filed: Jun. 11, 2020

(86) PCT No.: PCT/JP2020/022979
§ 371 (c)(1),
(2) Date: Dec. 10, 2021

(87) PCT Pub. No.: WO2020/250963
PCT Pub. Date: Dec. 17, 2020

(65) Prior Publication Data
US 2022/0262179 A1 Aug. 18, 2022

(30) Foreign Application Priority Data
Jun. 13, 2019 (JP) .................... 2019-110528

(51) Int. Cl.
*G07C 5/08* (2006.01)
*G07C 5/00* (2006.01)

(52) U.S. Cl.
CPC .......... *G07C 5/0825* (2013.01); *G07C 5/008* (2013.01)

(58) Field of Classification Search
CPC ......... G07C 5/0825; G07C 5/008; B60S 5/00; G01M 17/007
See application file for complete search history.

(56) References Cited

U.S. PATENT DOCUMENTS

| 2017/0017667 A1* | 1/2017 | Chen .................... G01V 5/0016 |
| 2017/0116792 A1 | 4/2017 | Jelinek et al. |
| 2020/0216083 A1 | 7/2020 | Kawasaki et al. |

FOREIGN PATENT DOCUMENTS

| CN | 103640555 A | 3/2014 |
| JP | 2005-016949 A | 1/2005 |

(Continued)

OTHER PUBLICATIONS

Patent Cooperation Treaty, International Search Report, Application No. PCT/JP2020/022979, dated Sep. 8, 2020, in 5 pages.

(Continued)

*Primary Examiner* — Rodney A Butler
(74) *Attorney, Agent, or Firm* — Procopio, Cory, Hargreaves & Savitch LLP (57) ABSTRACT

A program for assisting an inspection of a vehicle causes an inspection assistance apparatus 2 to function as: a registration information acquisition unit 251 that acquires vehicle registration information corresponding to the vehicle; a vehicle identification number acquisition unit 252 that acquires a vehicle identification number indicating a type of the vehicle from an in-vehicle wireless device having wireless identification information associated with the vehicle registration information; an inspection item information acquisition unit 253 that acquires inspection item information indicating a plurality of inspection items associated with the type of the vehicle indicated by the vehicle identification number; and a display control unit 254 that causes a display unit to display, as inspection target items, the plurality of (Continued)

inspection items indicated by the inspection item information.

6 Claims, 11 Drawing Sheets

(56) References Cited

FOREIGN PATENT DOCUMENTS

| | | |
|---|---|---|
| JP | 2011-185727 A | 9/2011 |
| JP | 2015-127918 A | 7/2015 |
| JP | 2015-217728 A | 12/2015 |
| JP | 2018-122659 A | 8/2018 |
| JP | 2019-066181 A | 4/2019 |
| WO | 2011-111265 A1 | 9/2011 |
| WO | WO-2018190924 A1 * | 10/2018 ............. A62C 27/00 |

OTHER PUBLICATIONS

Patent Cooperation Treaty, Written Opinion, Application No. PCT/JP2020/022979, dated Sep. 8, 2020, in 3 pages.
National Intellectual Property Administration, Notification of the First Office Action, Application No. 202080043448.5, dated Jun. 7, 2023, in 16 pages.
German Patent and Trademark Office, Office Action, Application No. DE 11 2020 002 816.6, dated Jan. 22, 2024, in 14 pages.

* cited by examiner

| VEHICLE REGISTRATION INFORMATION | WIRELESS IDENTIFICATION INFORMATION | VEHICLE IDENTIFICATION NUMBER | INSPECTION EXECUTION ITEMS |
|---|---|---|---|
| SHINAGAWA XXX A YYY | 123ABC | DEF987 | ENGINE, BRAKE, ... |
| SHINAGAWA XXX B YYY | 234BCD | — | — |
| ⋮ | ⋮ | ⋮ | ⋮ |

Fig. 6

| VEHICLE IDENTIFICATION NUMBER | TYPE OF VEHICLE |
|---|---|
| DEF987 | IS12-EF |
| DEF876 | IS12-EF |
| ⋮ | ⋮ |
| GHI765 | IS24-GG |
| ⋮ | ⋮ |

Fig. 7

| TYPE OF VEHICLE | INSPECTION TARGET ITEMS ||
|---|---|---|
| | ESSENTIAL INSPECTION ITEMS | SELECTABLE INSPECTION ITEMS |
| IS12-EF | ENGINE, BRAKE, ... | LEFT AIR TANK, INSPECTION OF MOVABLE COMPONENTS, ... |
| IS24-GG | ... | ... |
| ⋮ | ⋮ | ⋮ |

INSPECTION RESULT

SHINAGAWA XXX A YYY

✓ INSPECTION IS COMPLETED.
INSPECTOR: FUJISAWA JIRO

| ENGINE | ✓ |
| --- | --- |
| BRAKE | ✓ |
| LAMPS | ✓ |
| STEERING WHEEL | ✓ |
| OTHERS | ✓ |

INSPECTION OF LEFT AIR TANK IS NOT REGISTERED.

INSPECTION ASSISTANCE PROGRAM, RECORDING MEDIUM, AND INSPECTION ASSISTANCE SYSTEM

CROSS-REFERENCE TO RELATED APPLICATIONS

This application is US National Stage of International Patent Application PCT/JP2020/022979, filed Jun. 11, 2020, which claims benefit of priority from Japanese Patent Application JP2019-110528, filed Jun. 13, 2019, the contents of both of which are incorporated herein by reference.

TECHNICAL FIELD

The present disclosure relates to an inspection assistance program, a storage medium, and an inspection assistance system that assist an inspection of a vehicle.

BACKGROUND ART

There has been disclosed a technique of displaying inspection items according to features (a steering wheel position, a vehicle body shape, and the number of doors) of a vehicle (for example, see Patent Literature 1).

CITATION LIST

Patent Literature

Patent Literature 1: JP-A-2015-127918

SUMMARY OF THE INVENTION

Technical Problem

However, even in a vehicle having the same features, when a type of the vehicle differs, a device installed in the vehicle may differ. Therefore, if inspection items are to be displayed according to the features of the vehicle, an inspection item that needs to be inspected may not be displayed, or an inspection item that does not need to be inspected may be displayed, and there is a concern that an inspection suitable for the type of the vehicle cannot be performed.

An object of the present disclosure is to provide a technique capable of performing an inspection suitable for a type of a vehicle.

Solution to Problem

According to a first aspect of the present disclosure, there is provided an inspection assistance program for assisting an inspection of a vehicle, the inspection assistance program causing a computer to function as: a registration information acquisition unit that acquires vehicle registration information corresponding to the vehicle; a vehicle identification number acquisition unit that acquires a vehicle identification number indicating a type of the vehicle from an in-vehicle wireless device having wireless identification information associated with the vehicle registration information; an inspection item information acquisition unit that acquires inspection item information indicating a plurality of inspection items associated with the type of the vehicle indicated by the vehicle identification number, and a display control unit that causes a display unit to display, as inspection target items, the plurality of inspection items indicated by the inspection item information.

For example, the inspection assistance program further causes the computer to function as a selection reception unit that receives selection of an inspection item to be inspected among a plurality of inspection items indicated by the inspection target items.

The display control unit may cause the display unit to display information indicating an inspection item whose selection is not received among the plurality of inspection items indicated by the inspection target items.

The display control unit may cause the display unit to display an inspection result including the information indicating an inspection item whose selection is not received.

The display control unit may cause the display unit to display an input reception screen for receiving an input for adding an inspection item to be inspected.

According to a second aspect of the present disclosure, there is provided a computer-readable storage medium storing a program for assisting an inspection of a vehicle, the program causing a computer to function as: a registration information acquisition unit that acquires vehicle registration information corresponding to the vehicle; a vehicle identification number acquisition unit that acquires a vehicle identification number indicating a type of the vehicle from an in-vehicle wireless device having wireless identification information associated with the vehicle registration information; an inspection item information acquisition unit that acquires inspection item information indicating a plurality of inspection items associated with the type of the vehicle indicated by the vehicle identification number, and a display control unit that causes a display unit to display, as inspection target items, the plurality of inspection items indicated by the inspection item information.

According to a third aspect of the present disclosure, there is provided an inspection assistance system for assisting an inspection of a vehicle, the inspection assistance system including: a registration information acquisition unit that acquires vehicle registration information corresponding to the vehicle; a vehicle identification number acquisition unit that acquires a vehicle identification number indicating a type of the vehicle from an in-vehicle wireless device having wireless identification information associated with the vehicle registration information; an inspection item information acquisition unit that acquires inspection item information indicating a plurality of inspection items associated with the type of the vehicle indicated by the vehicle identification number, and a display control unit that causes an information terminal of a user who inspects the vehicle to display, as inspection target items, the plurality of inspection items indicated by the inspection item information.

Advantageous Effects of Invention

According to the present disclosure, it is possible to perform the inspection suitable for a type of a vehicle.

DESCRIPTION OF EMBODIMENTS

[Overview of Inspection Assistance System S]

Figure 1:
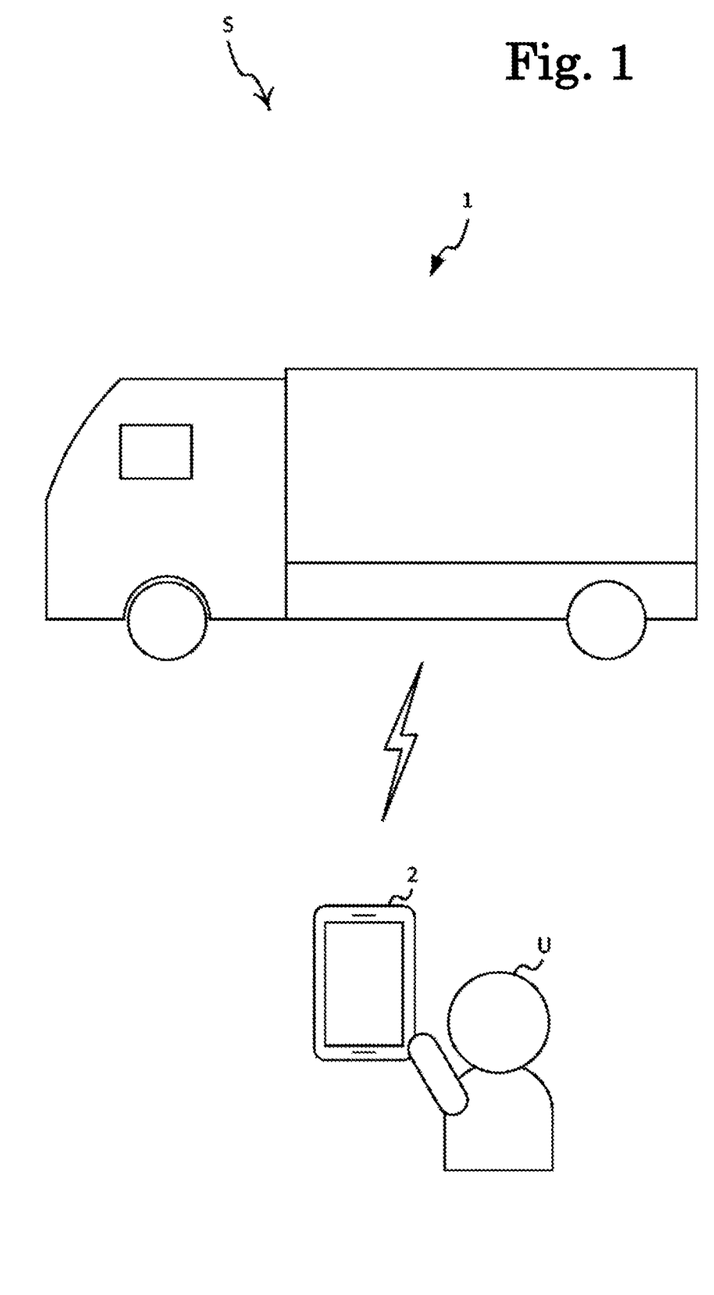
FIG. 1 is a diagram illustrating a configuration of an inspection assistance system according to an embodiment.

FIG. 1 is a diagram illustrating a configuration of an inspection assistance system S according to an embodiment. The inspection assistance system S includes an inspection assistance apparatus 2 for assisting an inspection of a vehicle 1. The vehicle 1 is a commercial vehicle, and is, for example, a truck. The inspection assistance apparatus 2 is a device managed by a business operator who inspects the vehicle 1, and is, for example, an information terminal such as a smartphone or a tablet.

The inspection assistance apparatus 2 displays, on a display, an inspection item and an inspection method required for the inspection of the vehicle 1 when an inspection application software (hereinafter, referred to as an "inspection application") is started. The inspection assistance apparatus 2 receives an operation of a user U who inputs an inspection result.

The inspection assistance apparatus 2 communicates with the vehicle 1 by wireless communication via an in-vehicle wireless device mounted on the vehicle 1. For example, the inspection assistance apparatus 2 communicates with the vehicle 1 by Wi-Fi (registered trademark) or Bluetooth (registered trademark). The inspection assistance apparatus 2 transmits, for example, instruction information for changing a state of equipment of the vehicle 1 to the vehicle 1 by wireless communication.

Figure 2:
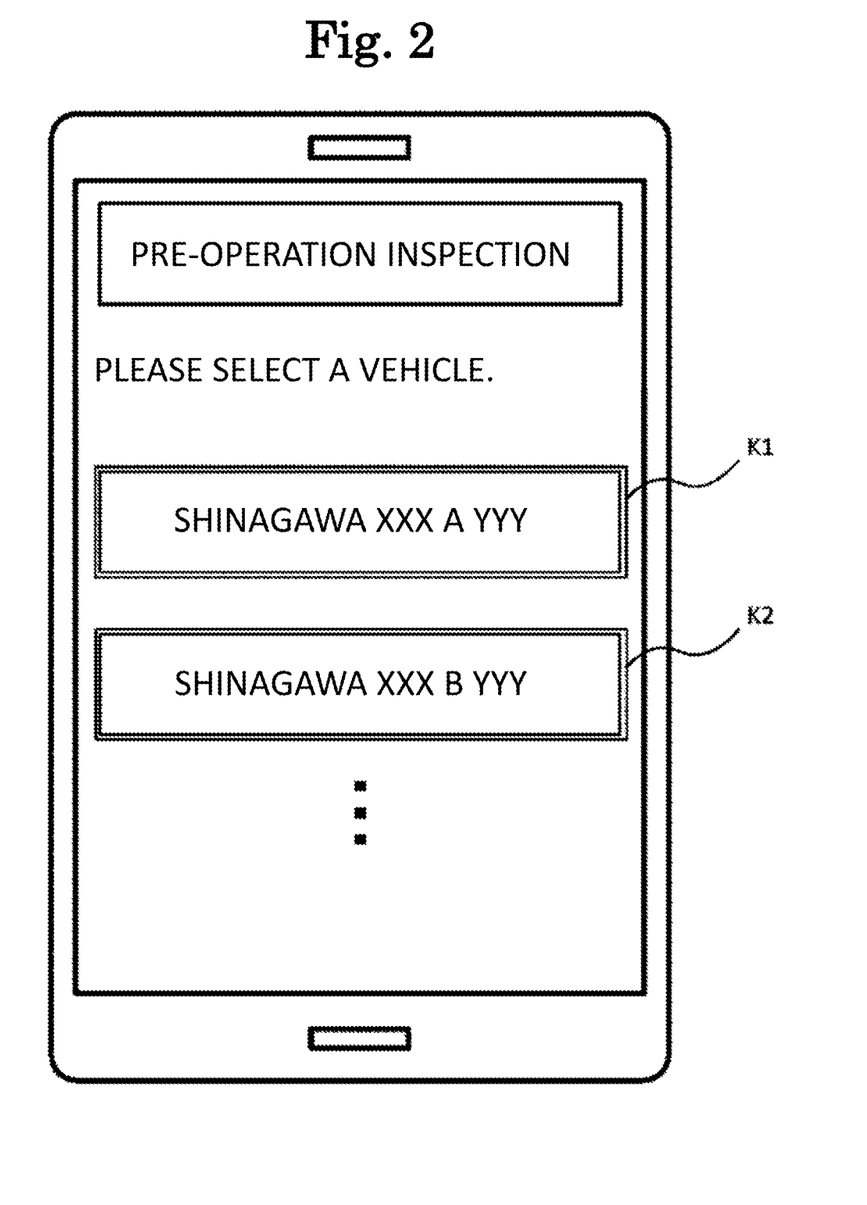
FIG. 2 is a diagram illustrating a screen that is displayed by an inspection assistance apparatus immediately after an inspection application is started.

FIG. 2 is a diagram illustrating a screen that is displayed by the inspection assistance apparatus 2 immediately after the inspection application is started. As illustrated in FIG. 2, the inspection assistance apparatus 2 displays a screen for selecting the vehicle 1 to be inspected. In the example of FIG. 2, an operation key K1 for selecting a vehicle with vehicle registration information of "SHINAGAWA XXX A YYY" and an operation key K2 for selecting a vehicle with vehicle registration information of "SHINAGAWA XXX B ZZZ" are displayed. The vehicle registration information is information for specifying the vehicle 1, and is registered in advance by the user U. For example, the vehicle registration information is an automobile registration number of the vehicle 1.

When an operation of selecting the vehicle 1 is performed in the screen of FIG. 2, an inspection item necessary for the inspection of the selected vehicle 1 is displayed. The user U performs an inspection corresponding to the displayed inspection item, and inputs an inspection result to the inspection assistance apparatus 2. When an inspection item to be inspected by changing a state of equipment of the vehicle 1 is displayed, the inspection assistance apparatus 2 transmits instruction information for changing the state of the equipment corresponding to the inspection item to the vehicle 1. In this way, the user U can inspect the vehicle 1 without directly operating the vehicle 1.

Further, the inspection assistance apparatus 2 can newly add the vehicle 1 to be inspected. In this case, the inspection assistance apparatus 2 displays a plurality of inspection items corresponding to the type of the vehicle 1, and registers inspection items, which are selected by the user U among the plurality of displayed inspection items, as inspection execution items for performing inspection on the vehicle 1. Then, the inspection assistance apparatus 2 displays the registered inspection execution items as inspection items of the vehicle 1. In this way, the user U can perform the inspection suitable for the vehicle 1 to be inspected.

[Configuration of Vehicle 1]

Figure 3:
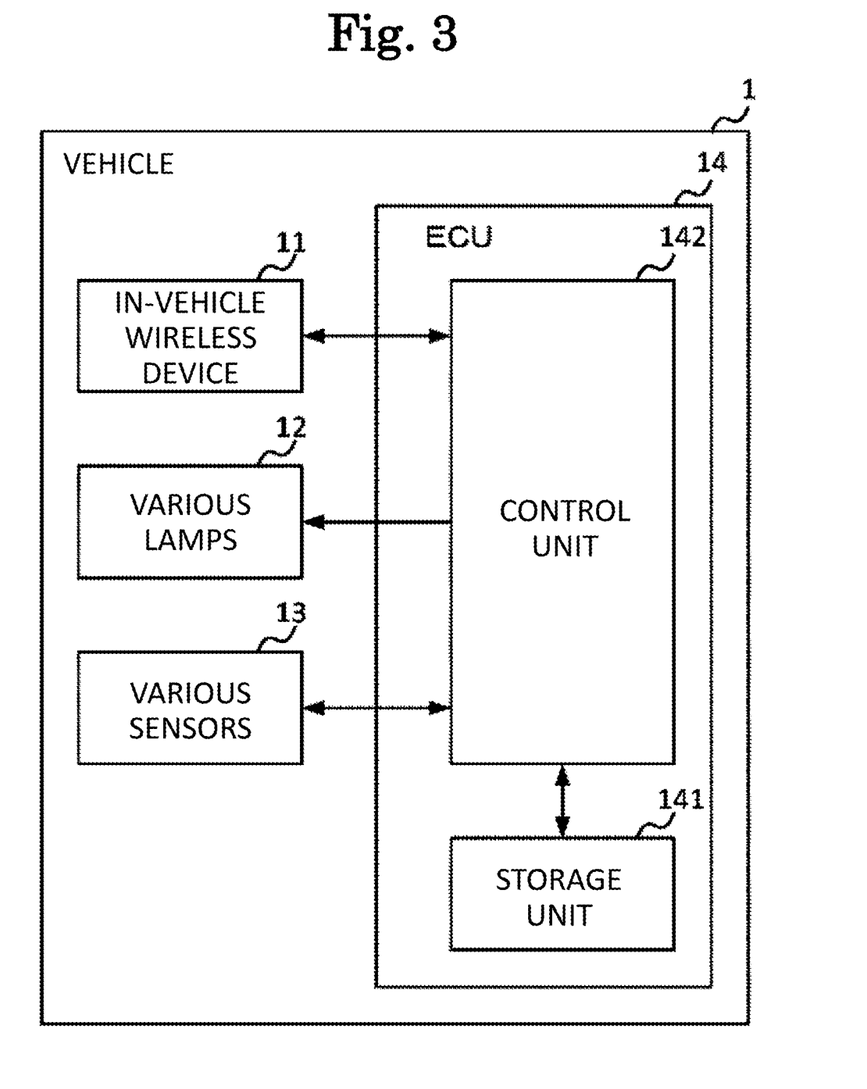
FIG. 3 is a diagram illustrating a configuration of a vehicle.

FIG. 3 is a diagram illustrating a configuration of the vehicle 1. The vehicle 1 includes an in-vehicle wireless device 11, various lamps 12, various sensors 13, and an electronic control unit (ECU) 14. The ECU 14 includes a storage unit 141 and a control unit 142.

The in-vehicle wireless device 11 is a device for communicating with the inspection assistance apparatus 2 by wireless communication. The in-vehicle wireless device 11 transmits information notified from the control unit 142 to the inspection assistance apparatus 2. In addition, the in-vehicle wireless device 11 notifies the control unit 142 of information received from the inspection assistance apparatus 2. The in-vehicle wireless device 11 may transmit the information, which is notified from the control unit 142, to a device other than the inspection assistance apparatus 2 (for example, a server).

The various lamps 12 include, for example, a brake lamp, a backlight, and the like. The various sensors 13 include, for example, a sensor for detecting depression of a brake pedal, a sensor for detecting that a gear is put into reverse, and the like.

The ECU 14 is a control device for electronically controlling each part of the vehicle 1 by a computer. The storage unit 141 is configured with, for example, a read only memory (ROM), a random access memory (RAM), and the like. The storage unit 141 stores various programs and various types of data for causing the control unit 142 to function.

The control unit 142 controls each part of the vehicle 1 by executing a program stored in the storage unit 141. For example, the control unit 142 turns on or turns off the various lamps 12 in accordance with information received from the inspection assistance apparatus 2 via the in-vehicle wireless device 11. In addition, the control unit 142 transmits information, which is created based on detection results detected by the various sensors 13, to the inspection assistance apparatus 2 via the in-vehicle wireless device 11.

[Configuration of Inspection Assistance Apparatus 2]

Figure 4:
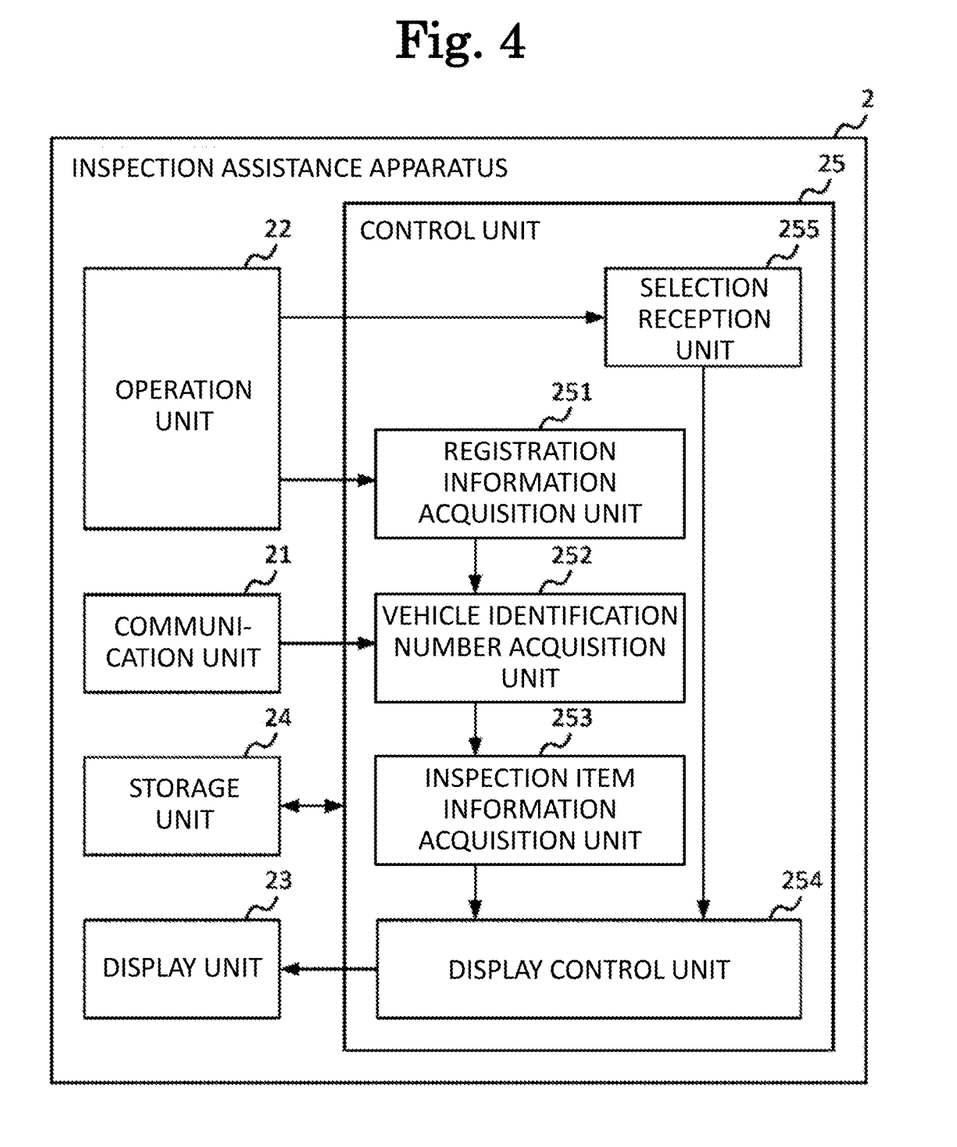
FIG. 4 is a diagram illustrating a configuration of the inspection assistance apparatus.

FIG. 4 is a diagram illustrating a configuration of the inspection assistance apparatus 2. The inspection assistance apparatus 2 includes a communication unit 21, an operation unit 22, a display unit 23, a storage unit 24, and a control unit 25. The communication unit 21 is a communication module for communicating with the vehicle 1 by wireless communication.

The operation unit 22 receives an operation performed by the user U. The operation unit 22 includes various buttons of the inspection assistance apparatus 2 and a touch panel superimposed on the display unit 23. The operation unit 22 detects that the user U performs an operation, and notifies the control unit 25 of detected operation content. The display unit 23 is a display that displays various screens, and is, for example, a liquid crystal display.

The storage unit 24 is configured with, for example, a ROM, a RAM, and the like. The storage unit 24 is a storage medium that stores various programs for causing the control unit 25 to function. The storage unit 24 stores the vehicle registration information, wireless identification information, and a vehicle identification number in association with one another.

The wireless identification information is information for identifying the in-vehicle wireless device 11 of the vehicle 1. For example, the information for identifying the in-vehicle wireless device 11 is a service set identifier (SSID) of the in-vehicle wireless device 11. The wireless identification information may include an encryption key for connecting to the in-vehicle wireless device 11.

The vehicle identification number is a number unique to the vehicle 1 for identifying the vehicle 1, and is, for example, a vehicle identification number. The vehicle identification number includes information indicating a type of the vehicle. The vehicle identification number may include information of equipment mounted on the vehicle 1, such as an engine, a body, a chassis, and optional parts.

Figure 5:
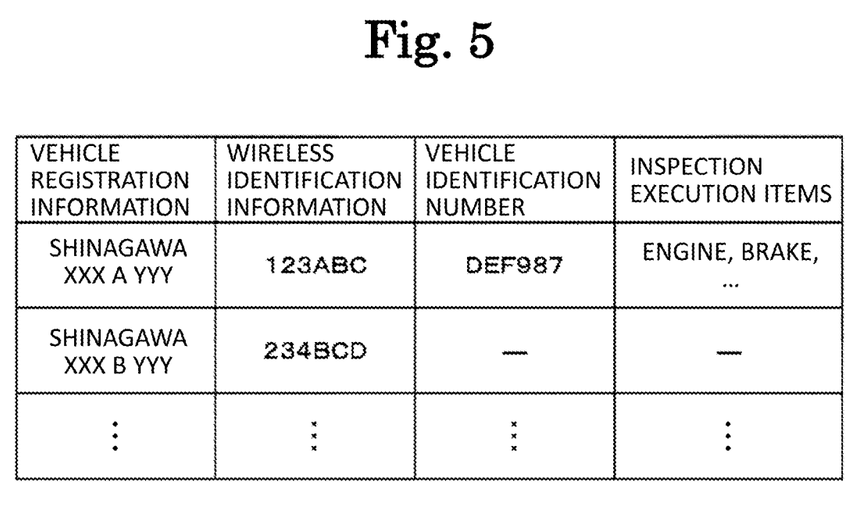
FIG. 5 is a schematic diagram of a data table in which vehicle registration information, wireless identification information, vehicle identification number, and inspection execution items are associated.

The storage unit 24 stores an inspection execution item of the vehicle 1 corresponding to vehicle registration information in association with the vehicle registration information. FIG. 5 is a schematic diagram of a data table in which vehicle registration information, wireless identification information, a vehicle identification number, and an inspection execution items are associated. In the example of FIG. 5, vehicle registration information "SHINAGAWA XXX A YYY" is associated with wireless identification information "123ABC", a vehicle identification number "DEF987", and an inspection execution item.

Figure 6:
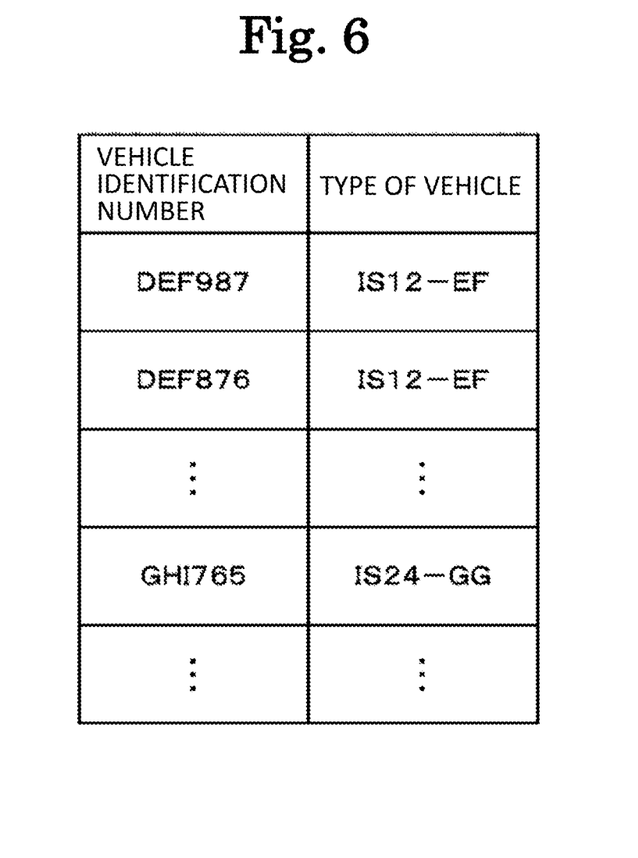
FIG. 6 is a schematic diagram of a data table in which vehicle identification number is associated with a type of a vehicle.

The storage unit 24 may store a vehicle identification number and a type of a vehicle indicated by the vehicle identification number in association with each other. The type of a vehicle is information for identifying a kind or model of the vehicle. FIG. 6 is a schematic diagram of a data table in which a vehicle identification number and a type of a vehicle are associated with each other.

Figure 7:
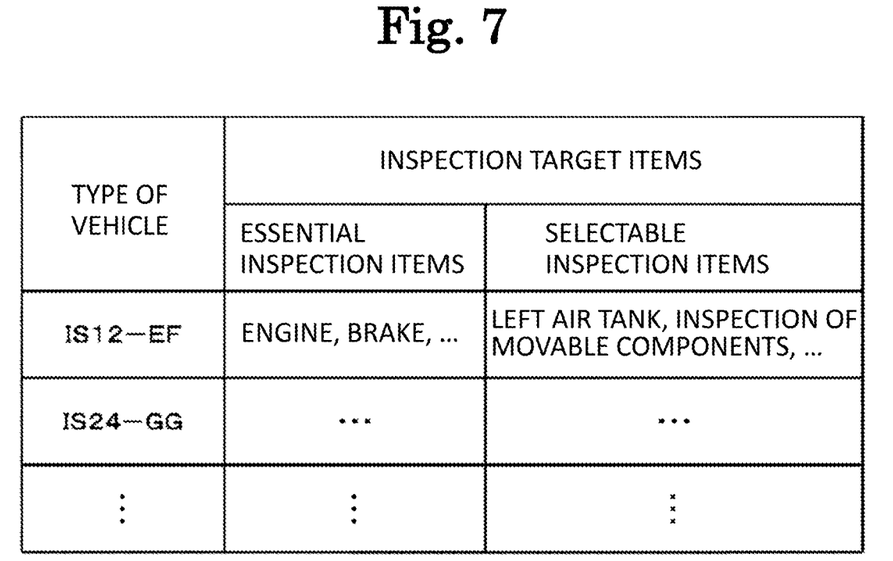
FIG. 7 is a schematic diagram of a data table in which a type of a vehicle is associated with a plurality of inspection items.

The storage unit 24 stores a type of a vehicle and a plurality of inspection items in association. FIG. 7 is a schematic diagram of a data table in which a type of a vehicle is associated with a plurality of inspection items. For example, the storage unit 24 stores, in association with a type of a vehicle, an essential inspection item whose inspection is essential for the vehicle of the type and a selectable inspection item whose inspection can be selectively performed. The selectable inspection item is directed to, for example, an inspection of an optional part that is provided or not provided in the vehicle 1, or an inspection recommended by a manufacturer of the vehicle 1.

The control unit 25 includes a processor such as a central processing unit (CPU). The control unit 25 functions as a registration information acquisition unit 251, a vehicle identification number acquisition unit 252, an inspection item information acquisition unit 253, a display control unit 254, and a selection reception unit 255 by reading and executing a program stored in the storage unit 24.

The registration information acquisition unit 251 acquires vehicle registration information corresponding to the vehicle 1 to be inspected. For example, the registration information acquisition unit 251 acquires vehicle registration information selected by the user U from a plurality of pieces of vehicle registration information displayed on the display unit 23.

When an inspection execution item is not in association with the vehicle registration information acquired by the registration information acquisition unit 251, the vehicle identification number acquisition unit 252 acquires a vehicle identification number indicating the type of the vehicle 1. For example, the vehicle identification number acquisition unit 252 acquires the vehicle identification number from the in-vehicle wireless device 11 having wireless identification information associated with the vehicle registration information. Specifically, the vehicle identification number acquisition unit 252 acquires the vehicle identification number from the in-vehicle wireless device 11 communicably connected to the inspection assistance apparatus 2.

The inspection item information acquisition unit 253 refers to a data table stored in the storage unit 24 in which a type of a vehicle is associated with a plurality of inspection items, and acquires inspection item information indicating a plurality of inspection items associated with the type of the vehicle indicated by the vehicle identification number acquired by the vehicle identification number acquisition unit 252. The display control unit 254 causes the display unit 23 to display the plurality of inspection items indicated by the acquired inspection item information as inspection target items. For example, the display control unit 254 causes selection target items associated with the type of the vehicle to be displayed as the inspection target items. The display control unit 254 may cause an essential inspection item to be displayed as the inspection target item.

Figure 8:
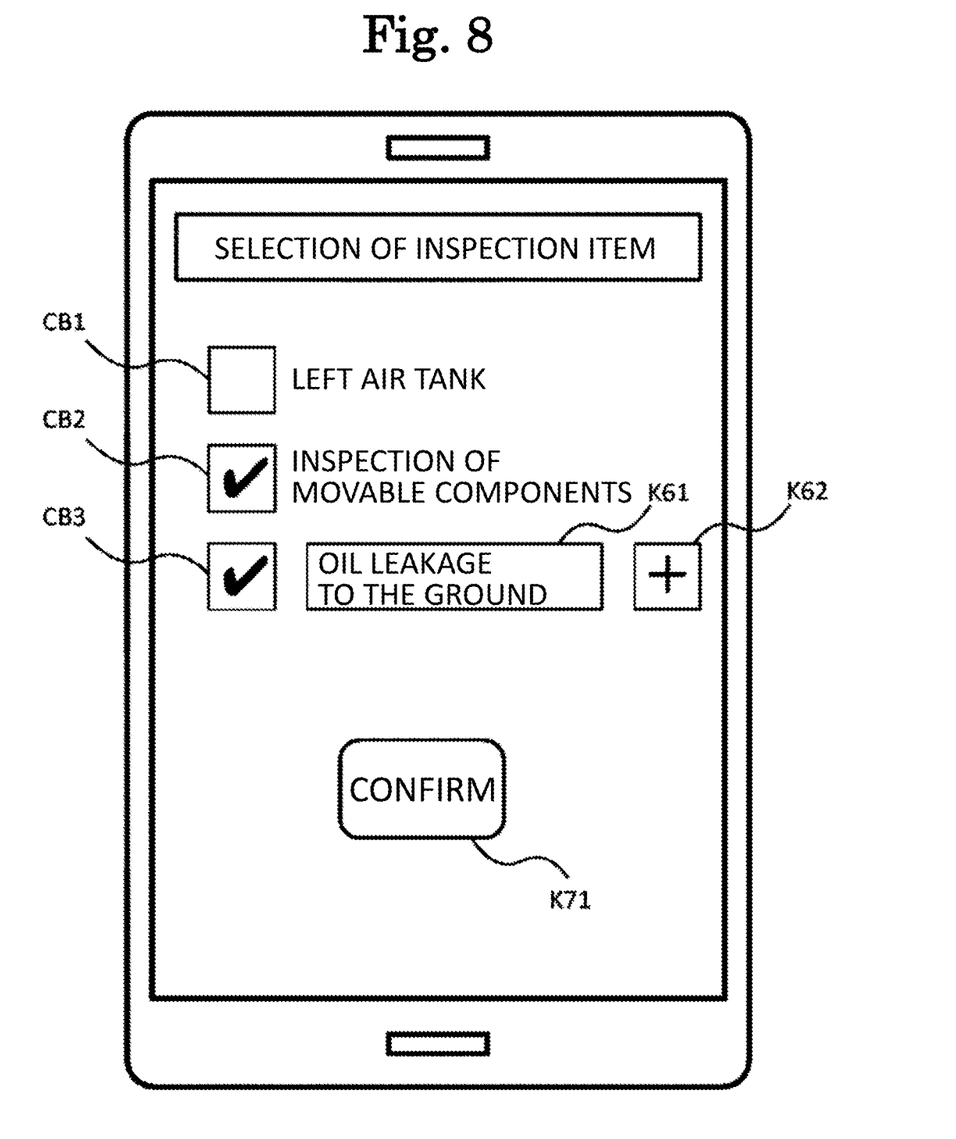
FIG. 8 is a schematic diagram illustrating an example of a selection screen.

The display control unit 254 displays a selection screen for receiving selection of an inspection item to be inspected among selection target items displayed on the display unit 23. The selection screen includes a selection portion for selecting a selection target item. FIG. 8 is a schematic diagram illustrating an example of the selection screen. Selection portions CB1 to CB3 in FIG. 8 are check boxes for receiving selection of selection target items.

The selection reception unit 255 receives selection of an inspection item to be inspected among a plurality of inspection items indicated by inspection target items. Specifically, the selection reception unit 255 accepts selection operations input to the selection portions CB1 to CB3. The user U can check the selection portions CB1 to CB3 to select selection target items corresponding to checked check boxes as inspection execution items.

The display control unit 254 may cause the display unit 23 to display an input reception screen for receiving an input for adding an inspection item to be inspected. For example, the display control unit 254 displays, as the input reception screen, a selection screen including an input reception portion for receiving an input of an inspection item. An input reception portion K61 in FIG. 8 is a text box for receiving an input of an inspection item. The user U can input an arbitrary character string to the text box.

The user U can add an input reception portion by selecting an addition key K62. When the addition key K62 is selected, the display control unit 254 displays a new input reception portion. In this way, the user U can arbitrarily add an inspection to be performed.

Figure 9:
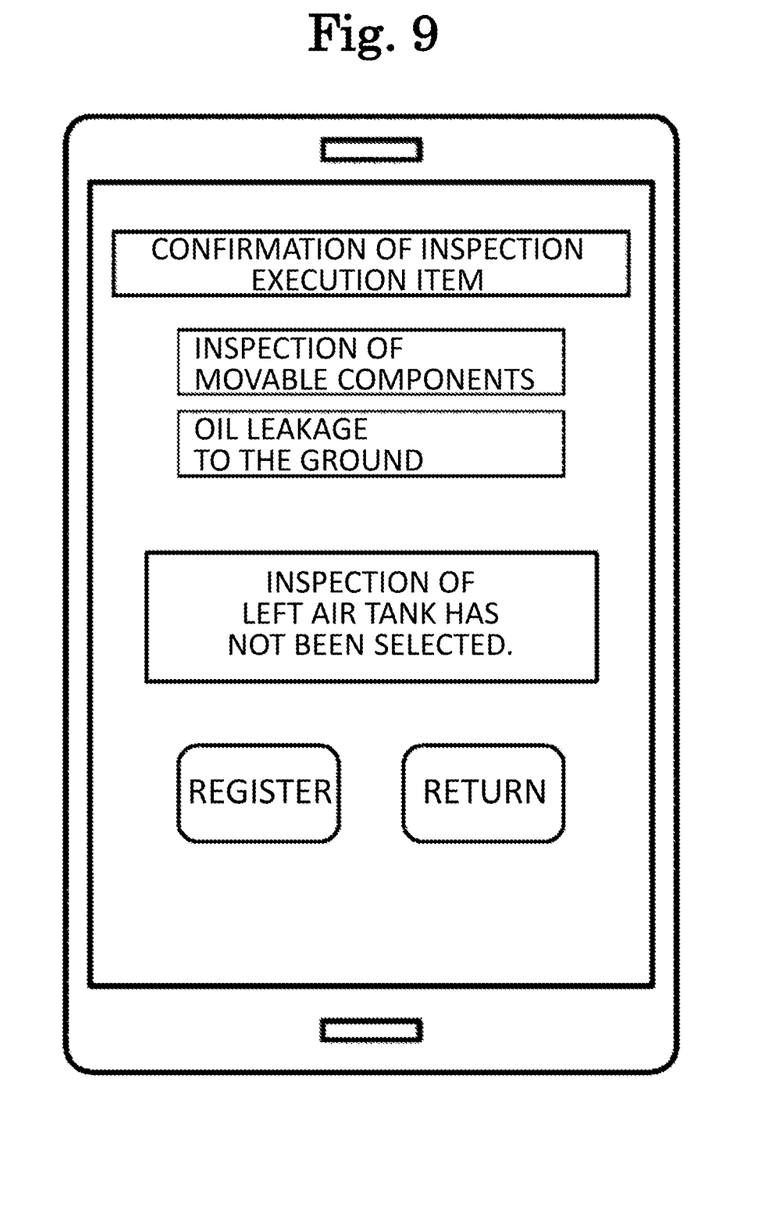
FIG. 9 is a schematic diagram illustrating an example of a confirmation screen.

The display control unit 254 causes the display unit 23 to display a confirmation screen for confirming that a selected selection target item is registered as an inspection execution item. For example, when a confirmation key K71 for transition to a confirmation screen is selected, the display control unit 254 causes the display unit 23 to display a confirmation screen including the selection target item selected by the user U. FIG. 9 is a schematic diagram illustrating an example of the confirmation screen. The display control unit 254 displays an inspection item selected by the user U and an inspection item additionally input by the user U. In the example of FIG. 9, "inspection of a movable component", which is selected, and "oil leakage to the ground", which is input and received as an added inspection item, are displayed.

The display control unit 254 causes the display unit 23 to display attention-requiring information that indicates an inspection item whose selection is not received among a plurality of inspection items indicated by inspection target items. Specifically, the display control unit 254 highlights a selection target item whose selection is not received among inspection items displayed as selectable inspection items. In the example of FIG. 9, a text in bold letters of "Inspection of left air tank has not been selected." is surrounded in a frame and displayed as information indicating that the "left air tank" is not selected. In this way, the inspection assistance apparatus 2 can confirm that there is a selectable inspection item that is not selected, and thus it is possible to prevent the user U from forgetting to select an inspection item to be inspected.

When a "register" key for registering a selectable inspection item as an inspection execution item is selected, the selection reception unit 255 stores the selected selectable inspection item and an input inspection item in the storage unit 24 in association with vehicle registration information. When a "return" key for re-selecting an inspection item is selected, the display control unit 254 displays a selection screen of inspection item again.

After the selected selectable inspection item and the input inspection item is stored in the storage unit 24 in association with the vehicle registration information, the display control unit 254 may display a registration completion screen notifying that inspection item registration is completed. After displaying the registration completion screen, the display control unit 254 may display an inspection screen corresponding to the registered inspection execution item. In this way, the user U can quickly start inspection of the vehicle 1 for which the inspection item is registered.

Figure 10:
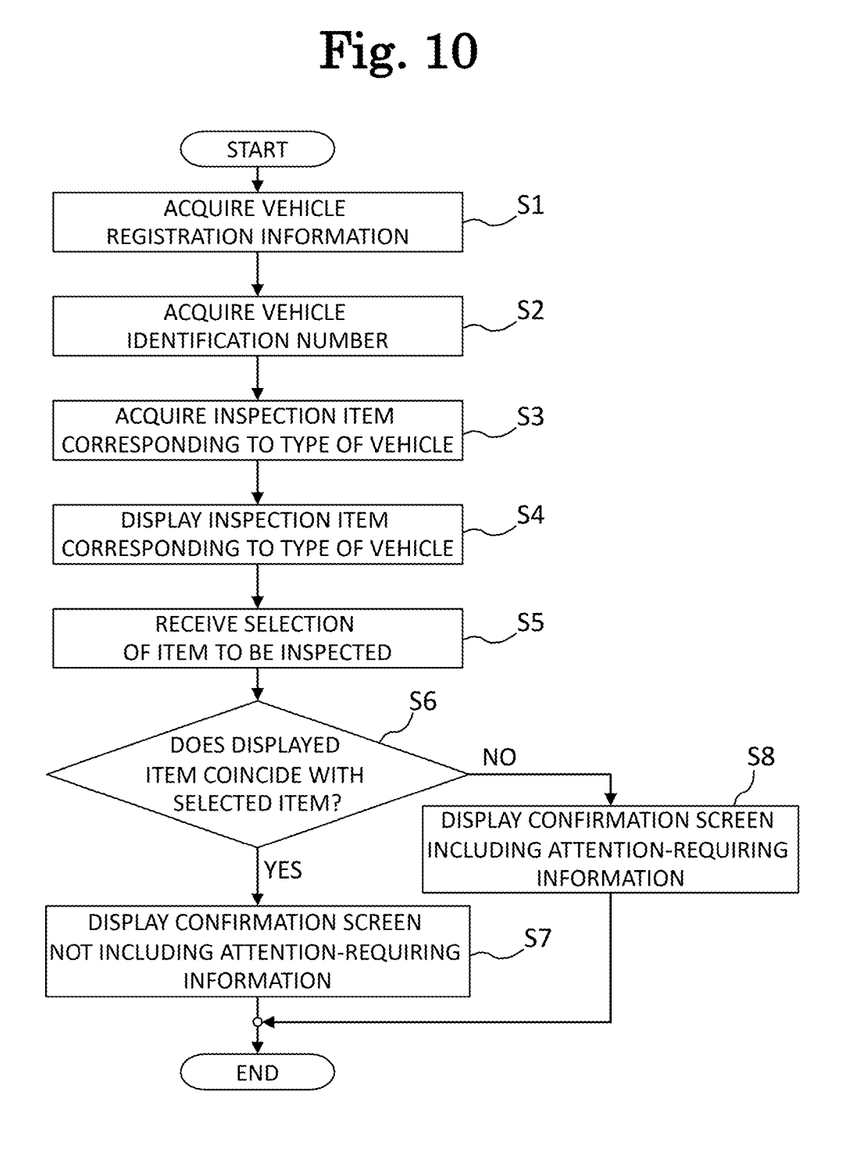
FIG. 10 is a flowchart of processing executed by the inspection assistance apparatus.

A flow of processing executed by the inspection assistance apparatus 2 will be described. FIG. 10 is a flowchart of the processing executed by the inspection assistance apparatus 2. First, the registration information acquisition unit 251 acquires vehicle registration information corresponding to the vehicle 1 for which an inspection item is registered (step S1). The vehicle identification number acquisition unit 252 acquires a vehicle identification number from the in-vehicle wireless device 11 identified by wireless identification information associated with the vehicle registration information (step S2).

The inspection item information acquisition unit 253 acquires a plurality of inspection items associated with a type of the vehicle indicated by the vehicle identification number (step S3). The display control unit 254 causes the display unit 23 to display the acquired plurality of inspection items associated with the type of the vehicle (step S4).

The selection reception unit 255 receives selection of an inspection item to be inspected among the plurality of inspection items displayed on the display unit 23 (step S5). The display control unit 254 determines whether a displayed selection target item coincides with the selected inspection item (step S6). When the displayed selection target item coincides with the selected inspection item (Yes in step S6), the display control unit 254 causes the display unit 23 to display a confirmation screen that does not include attention-requiring information (step S7). When the displayed selection target item does not coincide with the selected inspection item (No in step S6), the display control unit 254 causes the display unit 23 to display a confirmation screen that includes attention-requiring information (step S8).

Modification Example 1

Figure 11:
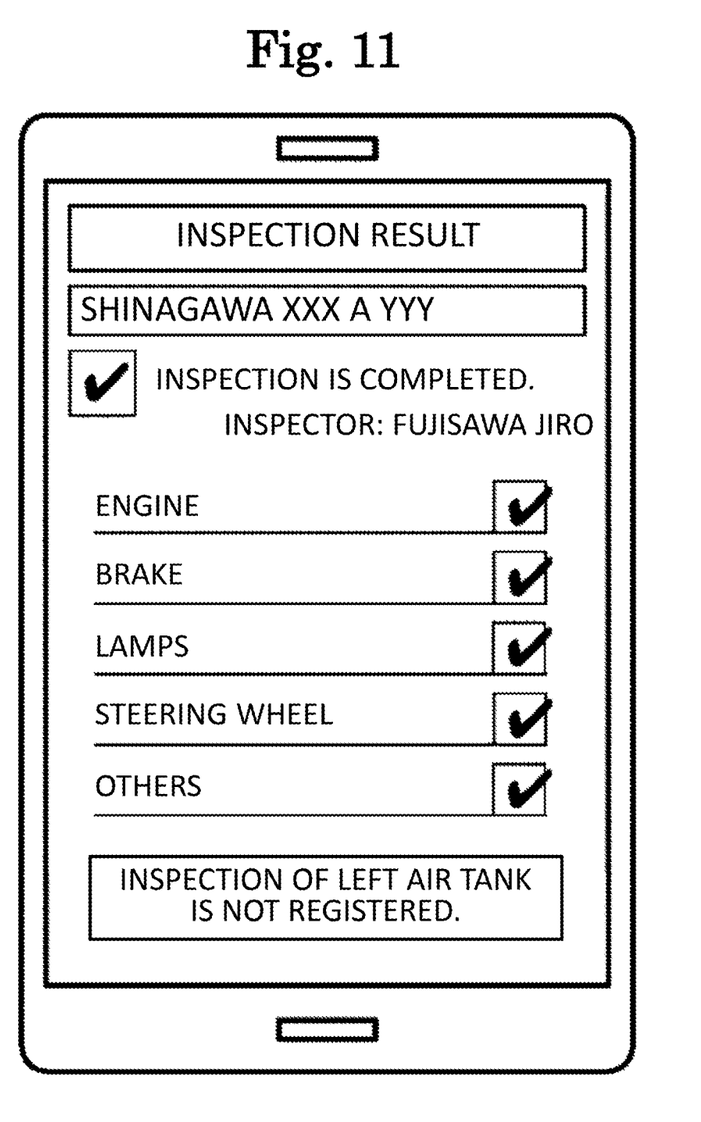
FIG. 11 is a schematic diagram illustrating an example of an inspection result screen.

When information related to an inspection item that is not selected as an inspection execution item is not displayed at the time of inspection, it may not be possible to know whether the inspection item is not displayed due to lack of necessity of inspection or whether the inspection item is not registered although inspection of the inspection item is necessary. Therefore, the inspection assistance apparatus 2 displays an inspection result including information related to an inspection item that is not selected when inspection items are registered. Specifically, the display control unit 254 causes the display unit 23 to display an inspection result screen including information indicating an inspection item whose selection is not received when inspection execution items are registered. FIG. 11 is a schematic diagram illustrating an example of the inspection result screen. In the example of FIG. 11, as information indicating an inspection item whose selection is not received, a text of "Inspection of left air tank is not registered." is displayed. In this way, the user U can grasp that there is an inspection item that is not selected at the time of registration.

Modification Example 2

Not limited to the above description, the inspection assistance system S may include an inspection management device capable of communicating with the inspection assistance apparatus 2. The inspection management device has at least a part of functions of an inspection application. The inspection management device is, for example, a server managed by a business operator who inspects the vehicle 1. Further, the inspection management device may have all functions of the inspection application. In this case, a display control unit of the inspection management device causes the inspection assistance apparatus 2 of the user U who inspects the vehicle 1 to display various types of information. Specifically, the display control unit of the inspection management device causes the inspection assistance apparatus 2 to display, as inspection target items, a plurality of inspection items associated with a type of the vehicle indicated by a vehicle identification number.

Effects of Inspection Assistance Apparatus 2 According to Embodiment

As described above, the inspection assistance apparatus 2 acquires the vehicle registration information corresponding to the vehicle 1, and acquires the vehicle identification number indicating the type of the vehicle 1 from the in-vehicle wireless device 11 having the wireless identification information associated with the acquired vehicle registration information. Then, the inspection assistance apparatus 2 causes the display unit 23 to display, as inspection target items, the inspection item information indicating a plurality of inspection items associated with the type of the vehicle 1 indicated by the vehicle identification number. In this way, the inspection assistance apparatus 2 can display the inspection items corresponding to the type of the vehicle 1 to be inspected, and thus the user U can perform inspection suitable for the type of the vehicle 1.

Although the present disclosure has been described above using the embodiment, the technical scope of the present disclosure is not limited to the scope described in the above embodiment, and various modifications and changes can be made within the scope of the gist of the present disclosure. For example, all or some of the devices may be functionally or physically distributed or integrated in any unit. Further, a new embodiment generated by any combination of a plurality of embodiments is also contained in the embodiment of the present disclosure. Effects of the new embodiment generated by the combination include effects of the original embodiment.

The present application is based on Japanese Patent Application (No. 2019-110528) filed on Jun. 13, 2019, contents of which are incorporated herein as reference.

INDUSTRIAL APPLICABILITY

The inspection assistance program, the storage medium, and the inspection assistance system of the present disclosure are useful in performing an inspection suitable for a type of a vehicle.

LIST OF REFERENCE NUMERALS

S inspection assistance system
1 vehicle
11 in-vehicle wireless device
12 various lamps
13 various sensors
14 ECU
141 storage unit
142 control unit
2 inspection assistance apparatus
21 communication unit
22 operation unit
23 display unit
24 storage unit
25 control unit
251 registration information acquisition unit
252 vehicle identification number acquisition unit
253 inspection item information acquisition unit
254 display control unit
255 selection reception unit
U user

The invention claimed is:

1. An inspection assistance system for assisting an inspection of a vehicle, the inspection assistance system comprising a storage unit and a controller configured to perform:
   registration information acquisition of acquiring vehicle registration information corresponding to the vehicle;
   vehicle identification number acquisition of acquiring a vehicle identification number indicating a type of the vehicle from an in-vehicle wireless device having wireless identification information associated with the vehicle registration information;
   inspection item information acquisition of acquiring inspection item information indicating a plurality of inspection items associated with the type of the vehicle indicated by the vehicle identification number; and
   display control of causing an information terminal of a user who inspects the vehicle to display, as inspection target items, the plurality of inspection items indicated by the inspection item information,
   wherein the storage unit stores the inspection items of the vehicle corresponding to the vehicle registration information in association with the vehicle registration information, and
   wherein the inspection target items provide the user with the inspection that is suitable for the type of the vehicle.

2. A non-transitory computer-readable storage medium storing an inspection assistance program for assisting an inspection of a vehicle, the inspection assistance program comprising instructions that cause a computer to perform:
   registration information acquisition of acquiring vehicle registration information corresponding to the vehicle;
   vehicle identification number acquisition of acquiring a vehicle identification number indicating a type of the vehicle from an in-vehicle wireless device having wireless identification information associated with the vehicle registration information;
   inspection item information acquisition of acquiring inspection item information indicating a plurality of inspection items associated with the type of the vehicle indicated by the vehicle identification number; and
   display control of causing a display unit to display, as inspection target items, the plurality of inspection items indicated by the inspection item information.

3. The non-transitory computer-readable storage medium according to claim 1, wherein the inspection assistance program further comprising instructions that cause the computer to perform:
   selection reception of receiving selection of an inspection item to be inspected, among a plurality of inspection items indicated by the inspection target items.

4. The non-transitory computer-readable storage medium according to claim 3,
   wherein the display control causes the display unit to display information indicating an inspection item whose selection is not received, among the plurality of inspection items indicated by the inspection target items.

5. The non-transitory computer-readable storage medium according to claim 4,
   wherein the display control causes the display unit to display an inspection result including the information indicating an inspection item whose selection is not received.

6. The non-transitory computer-readable storage medium according to claim 2,
   wherein the display control causes the display unit to display an input reception screen for receiving an input for adding an inspection item to be inspected.

\* \* \* \* \*